United States Patent [19]
Taira et al.

[11] 3,965,872
[45] June 29, 1976

[54] MAIN COMBUSTION CHAMBER OF SWIRL CHAMBER TYPE DIESEL ENGINE

[75] Inventors: Kaoru Taira; Hirotoshi Inoue, both of Toyota, Japan

[73] Assignee: Toyota Jidosha Kogyo Kabushiki Kaisha, Toyota, Japan

[22] Filed: Jan. 3, 1975

[21] Appl. No.: 538,264

[30] Foreign Application Priority Data
Aug. 6, 1974    Japan.................. 49-093367[U]

[52] U.S. Cl.................. 123/32 C; 123/193 P; 123/30 D; 123/33 M; 123/32 R
[51] Int. Cl.² .................. F02B 3/00; F02B 23/00
[58] Field of Search .............. 123/32 C, 32 D, 32 K, 123/32 R, 32 SP, 30 D, 191 S, 191 SP, 193 P, 33 M, 30 C

[56] References Cited
UNITED STATES PATENTS

3,105,470  10/1963  Huckel et al................. 123/32 C
3,196,857  7/1965  Zimmermann.................. 123/32 C Primary Examiner—Wendell E. Burns
Attorney, Agent, or Firm—Stevens, Davis, Miller & Mosher

[57] ABSTRACT

A main combustion chamber that permits efficient combustion throughout the entire rotation range comprising a groove extending diametrically from an edge portion of the top surface of a piston and a pair of twin-leaved recesses branched from amidst the groove, each one of the pair of twin-leaved recesses have an edge portion that is circular or otherwise. Both the groove and the recesses are formed in the top surface of a piston of a swirl chamber type diesel engine.

3 Claims, 13 Drawing Figures

Fig. 5
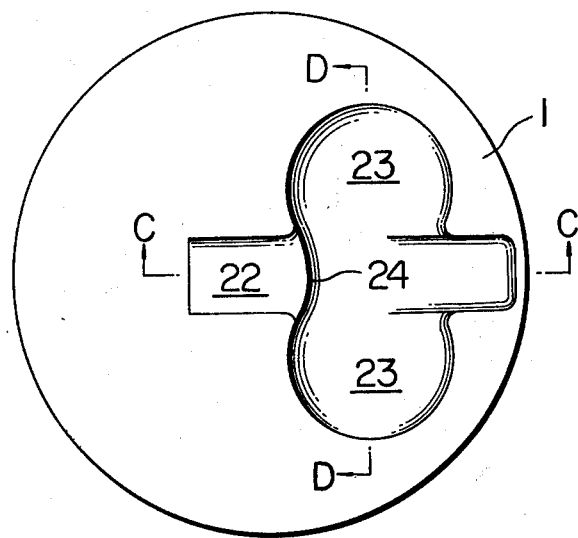
Fig. 6
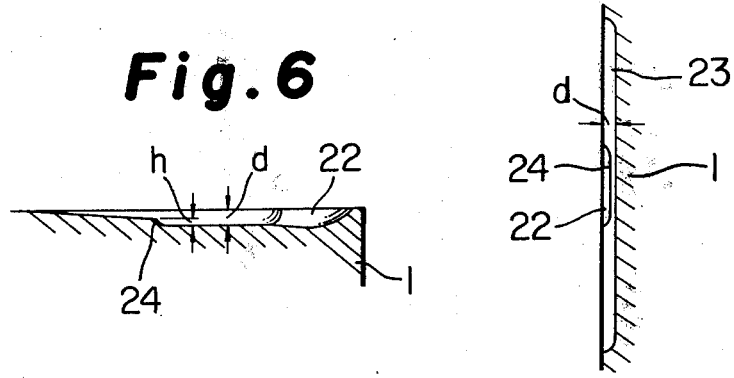
Fig. 7

MAIN COMBUSTION CHAMBER OF SWIRL CHAMBER TYPE DIESEL ENGINE

BACKGROUND OF THE INVENTION

1. Field of the Invention

This invention relates to the shape of a main combustion chamber formed in the top surface of a piston of a swirl chamber type diesel engine.

2. Description of the Prior Art

The so-called swirl chamber type diesel engines are popularly used, in which a swirl chamber is provided and combustion is transmitted to a main combustion chamber by shooting forth flame from the swirl chamber with a view to attaining better combustion.

In such swirl chamber type diesel engines, their main combustion chambers are designed with special shapes so that effective use is achieved of the air in the main combustion chamber formed in the top surface of a piston.

With respect to their shape, the conventional main combustion chambers can be broadly divided into the twin-leaved type main combustion chambers and the grooved type main combustion chambers. The twin-leaved type main combustion chambers are suited for medium to low-speed diesel engines, but not for high-speed ones, with which poor combustion results. In contrast, the grooved type main combustion chambers are suited for high-speed diesel engines, but unsuited for low-speed ones because of worsening combustion condition.

OBJECT OF THE INVENTION

Therefore, an object of this invention is to provide a main combustion chamber that affords good combustion condition at all engine speeds.

SUMMARY OF THE INVENTION

A feature of this invention is to provide a main combustion chamber by providing a straight inclined groove at the center of the top surface of the piston, and a pair of twin-leaved recesses branched from amidst said straight inclined groove.

This arrangement makes it possible to provide a main combustion chamber for a swirl chamber type diesel engine that accomplishes good combustion both at medium and low speed, which is an advantage of the conventional twin-leaved type main combustion chamber, and at high speed, which is an advantage of the grooved type main combustion chamber.

By varying the position, size, and shape of the twin-leaved recesses, or by changing the depth of the stepped portion which is positioned between the twin-leaved recesses and the straight inclined groove, it is possible to control properly the swirl and turbulence of the combustion gas and thereby effect a reduction of diesel smoke and noise, which is a desirable engine characteristic.

BRIEF DESCRIPTION OF THE DRAWINGS

This invention will now be described in detail with reference to the accompanying drawings, in which:

FIG. 5 is a plan view of a main combustion chamber according to this invention.

FIG. 6 is a cross-section taken along the line C—C of FIG. 5.

FIG. 7 is a cross-section taken along the line D—D of FIG. 5.

Figure 1:
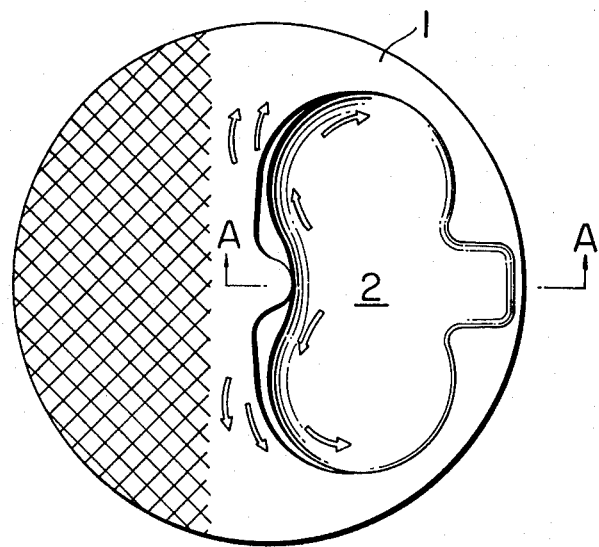
FIG. 1 is a plan view of a known twin-leaved type main combustion chamber.
Figure 2:
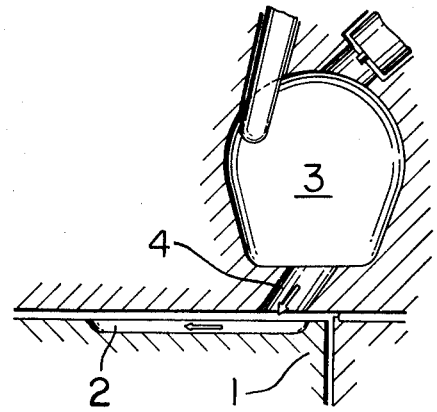
FIG. 2 is a cross-section taken along the line A—A of FIG. 1, including a swirl chamber.

A known twin-leaved type main combustion chamber will be described first, with reference to FIGS. 1 and 2.

In the top surface of a piston 1 is formed a twin-leaved type main combustion chamber 2, which resembles in shape a pair of swollen leaves parting right and left. Therefore, combustion gas from a swirl chamber 3 flows through a jet 4, as illustrated by the arrows in the drawings. When combustion gas flows at low speed, it swirls near the jet 4, as illustrated, and burns well. In the high-speed rotation area where air in the obliquely lined portion is not fully utilized, the flowing speed of combustion gas increases. Then it does not flow along the main combustion chamber, thereby disturbing said swirl and good combination.

Figure 3:
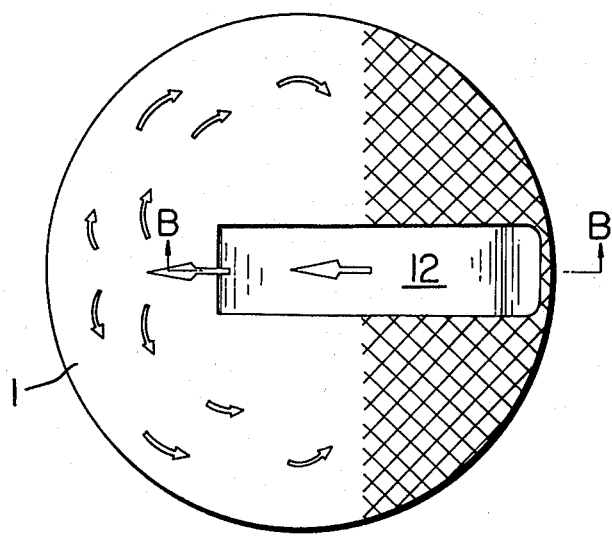
FIG. 3 is a plan view of a known grooved type main combustion chamber.
Figure 4:
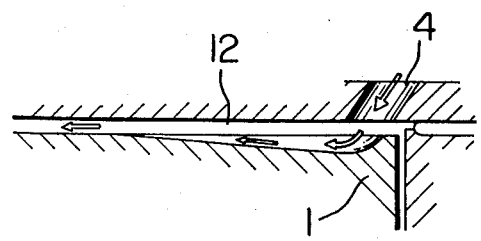
FIG. 4 is a cross-section taken along the line B—B of FIG. 3, including a jet of a swirl chamber.

Referring now to FIGS. 3 and 4, a known grooved type main combustion chamber will be described.

A long groove-like main combustion chamber 12 is provided at the center of the top surface of a piston 1. This main combustion chamber 12 is an inclined groove whose depth decreases progressing inward from the edge portion where it faces a jet 4 of the swirl chamber to the center of the piston's top surface (see FIG. 4). Therefore, gas injected through said jet 4 of the swirl chamber flows as illustrated by the arrows in FIGS. 3 and 4.

When combustion gas flows at high speed, good combustion is achieved. But when rotation speed decreases and combustion gas flows at low speed, air in the shaded portion of FIG. 3 is not effectively used.

This invention is designed to obviate such conventional defects as described above, whose structure is to be described hereunder with reference to FIGS. 5, 6 and 7.

In the top surface of a piston 1, there is provided a straight inclined groove 22, which extends diametrically from an edge portion of said surface and becomes shallower as it extends inward (see FIG. 6). There are also provided a pair of twin-leaved recesses branched from amidst said straight inclined groove 22. Each of said pair of twin-leaved recesses has a substantially circular edge portion. The depth of the portion of the straight inclined groove 22 which overlaps each of the twin-leaved recesses branching left and right is substantially uniform (see FIGS. 6 and 7). Therefore there is provided a stepped portion 24 in the straight inclined groove 22. The straight inclined groove 22 performs the same function as the conventional grooved main combustion chamber, and its width and length may be designed suitably. On the other hand, the branched twin-leaved recesses 23 perform the same function as the conventional twin-leaved type main combustion chamber. The shape of the edge portion of each twin-leaved recess, that is, whether circular, elliptic or otherwise, may be designed suitably.

Figure 8:
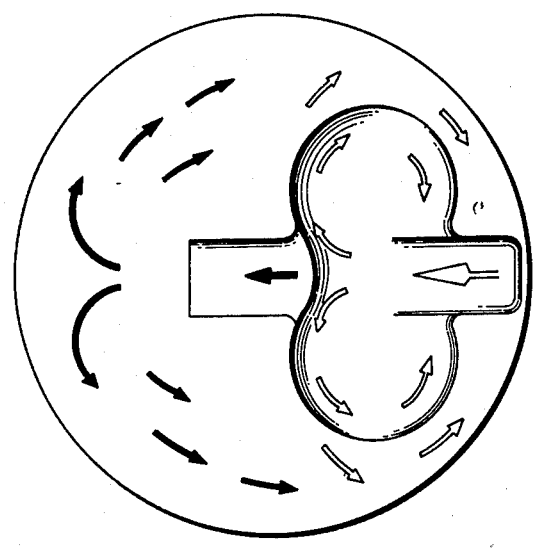
FIG. 8 schematically shows the flow of combustion gas in the main combustion chamber according to this invention.
Figure 9P:
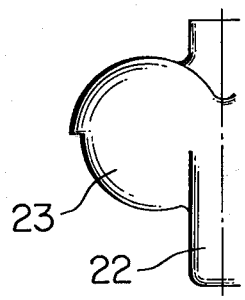
FIG. 9 is a plan view of one preferred embodiment according to this invention.
Figure 9S:
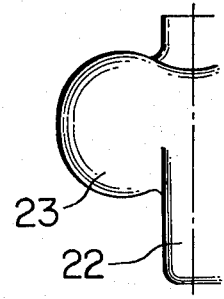
Figure 9Q:
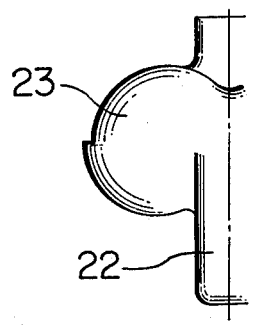
Figure 9T:
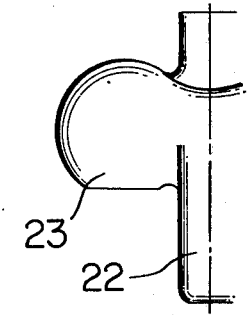
Figure 9R:
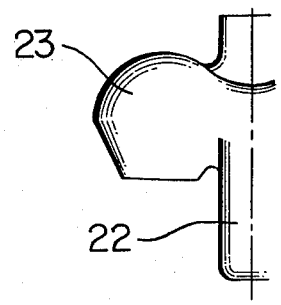

As described above, the function of the main combustion chamber according to this invention will now be described. As seen from FIG. 8, therefore, combustion gas from the straight inclined groove 22 almost covers the left half of the piston's top surface, flowing as indicated by the black arrows in the drawing. Combustion gas from the branched twin-leaved hollows 23, on the other hand, almost covers the right half of the surface, flowing as indicated by the white arrows. Consequently, air in the entire area of the piston's top surface is effectively utilized.

Further, it is suitable for medium-to-low speed diesel engines to enlarge the depth of the stepped portion 24 (indicated h in FIG. 6) because of the improved gas flow to the twin-leaved recesses 23. Otherwise, it is suitable for high speed diesel engines to diminish the depth of the stepped portion 24, because of the improved gas flow to the straight inclined groove 22. Thus it is possible to change the engine characteristic by changing the depth of the stepped portion 24. Furthermore by changing the shape of the circumference of the twin-leaved recesses 23, which is shown in FIG. 9, p, q, r, s and t, it is possible to control the swirl and turbulence of the combustion gas and thereby effect a reduction of diesel smoke and noise which, as previously noted, is a desirable engine characteristic.

Thus, the main combustion chamber according to this invention makes it possible to range, from low to high speed. This produces excellent results in improving the engine efficiency and lowering the concentration of exhaust gas and smoke.

As a result of experiments carried out by applying the main combustion chamber of this invention to the engine provided in the motor cars manufactured by the applicants' assignee, it has been found that both power output and torgue can be increased by 7 to 10 percent. Besides, it has been proved that the concentration of diesel smoke or black smoke peculiar to the diesel engine can be lowered.

What we claim is:

1. In a swirl chamber type diesel engine comprising a piston,
    a main combustion chamber comprising a straight inclined groove formed in the top surface of said piston, said straight groove extends diametrically from an edge portion of said surface and becoming shallower as the groove extends inward from said edge portion, said main combustion chamber further comprising a pair of twin-leaved recesses, each one of said pair of twin-leaved recesses extending from substantially the mid portion of a respective one of the pair of opposing straight sides of said straight inclined groove.

2. In a diesel engine as claimed in claim 1 wherein:
    each one of said pair of twin-leaved recesses has a substantially circular edge portion.

3. In a diesel engine as claimed in claim 1, wherein: said straight groove extends diametrically from said edge portion to a point beyond the center of the piston top surface.

* * * * *